United States Patent [19]

Guiton et al.

[11] Patent Number: 5,320,990
[45] Date of Patent: Jun. 14, 1994

[54] PROCESS FOR SINTERING ALUMINUM NITRIDE TO A HIGH THERMAL CONDUCTIVITY AND RESULTANT SINTERED BODIES

[75] Inventors: Theresa A. Guiton; Lynne K. Mills, both of Midland, Mich.

[73] Assignee: The Dow Chemical Company, Midland, Mich.

[21] Appl. No.: 39,657

[22] Filed: Mar. 30, 1993

[51] Int. Cl.$^5$ .............................................. C04B 35/58
[52] U.S. Cl. ......................................... 501/98; 501/96; 501/153; 264/65; 264/66
[58] Field of Search .......................... 501/96, 98, 153; 264/65, 66

[56] References Cited

U.S. PATENT DOCUMENTS

| | | | |
|---|---|---|---|
| 4,778,778 | 10/1988 | Mallia et al. | 501/96 |
| 4,847,221 | 7/1989 | Horiguchi et al. | 501/98 |
| 4,897,372 | 1/1990 | Huseby et al. | 501/96 |
| 4,952,535 | 8/1990 | Merkel | 501/98 X |
| 5,034,357 | 7/1991 | Yamakawa et al. | 501/98 X |

OTHER PUBLICATIONS

Guiton et al., "Optimiazation of Aluminum Nitride Thermal Condictivity Via Controlled Powder Processing", Mat. Res. Soc. Syump. Proc. vol. 271 (1992).
Miyashiro et al., "High Thermal Conductiviy Aluminum Nitide Ceramic Substrates and Packages", IEEE Trans. on Comp., Hybrids, and Manu. Tech. vol. 13, No. 2, Jun. 1990.
Buhr et al., "Phase composition, Oxygen Content, and Thermal Conductivity of AlN(Y$_2$O$_3$) Ceramics", J. Am Ceram. So., 74(4) 718–23 (1991).
Virkar, "Thermodynamic and Kinetic Effects of Oxygen Removal on the Thermal Conductivity of Aluminum Nitride", J. Am. Ceram. so., 72(11) 2031–41 (1989).
Watari et al., "Sintering Chemical Reactions to Increase Thermal Conductivity of Aluminum Nitride", J. Mater. Sci, 26 (1991) 4727–4732.
Yagi et al., "Migration of Grain Boundary phases in AlN Ceramics by Heating in Reduced Atmosphere", Nippon Ceramics Kyokai Gakujutsu Ronbunshi, 97(11) 1372–78 (1989).
Kuramoto et al. "Translucent AlN Ceramic Substrate", Proceedings, 36th ECC (1986).
Kurokawa et al. "Highly Thermal Conductive AlN Substrates", ISHM 1987 Proceedings.
Mizutani et al., "Sintering of AlN", Bull of the Cer Soc. of Japan.
Watari et al., "Thermal Conduction Mechanism of Aluminum Nitride Ceramics", J. Mater. Sci 27 (1992) 2627–2630.
Geith, et al., "Thermal Conductivity of Calcium–doped Aluminum Nitride Ceramics", J. Mater Sci., 28 (1993) 865–869.

*Primary Examiner*—Karl Group
*Attorney, Agent, or Firm*—D. R. Howard

[57] ABSTRACT

Prepare sintered aluminum nitride bodies having a thermal conductivity of at least 200 W/m-K by sintering under non-reducing conditions and controlling interrelated parameters such as binder burnout atmosphere, heating rate, sintering temperature, time at sintering temperature, cooling rate and cooling temperature. Sintered bodies having thermal conductivities in excess of 200, especially in excess of 270, W/m-K result from this process.

13 Claims, No Drawings

PROCESS FOR SINTERING ALUMINUM NITRIDE TO A HIGH THERMAL CONDUCTIVITY AND RESULTANT SINTERED BODIES

BACKGROUND OF THE INVENTION

The present invention relates generally to a process for preparing sintered aluminum nitride bodies and to bodies resulting from the process. The present invention relates more particularly to a process for preparing sintered aluminum nitride bodies having a thermal conductivity as high as about 285 watts/meter·°K (W/m-K).

Aluminum nitride (AlN) is subject to increasing interest as a microelectronic substrate material. With a thermal conductivity approaching that of berylia (BeO) and a thermal expansion coefficient well matched to silicon, AlN represents an attractive alternative in high power or multi-chip module applications.

At room temperature, single crystal AlN has a theoretical thermal conductivity of 319 W/m-K. Polycrystalline ceramics tend to have lower thermal conductivities than single crystal AlN due to a number of factors. The factors include random orientation of AlN grains, crystalline lattice impurity levels and existence of crystalline grain boundary phases with even lower thermal conductivities.

F. Miyashiro et al., in "High Thermal Conductivity Aluminum Nitride Ceramic Substrates and Packages", *IEEE Transactions on Components, Hybrids, and Manufacturing Technology*, Vol 13, No 2, 313-19 (June 1990), suggest that three key technologies are very important if one is to realize the highest thermal conductivity by sintering. The technologies are: reducing or minimizing oxygen content of AlN powders; proper choice and quantity of additives; and sintering conditions in terms of temperature, time and atmosphere. They show, in FIGS. 8-10: sintering at 1800° Centigrade (°C.) and 1900° C. for two hours with three weight percent (wt-%) yttria ($Y_2O_3$); sintering at 1800° C. in the presence of varying amounts of $Y_2O_3$; and sintering at 1800° C. for 24 hours with three wt-% $Y_2O_3$ with and without a reductive atmosphere. They suggest, in FIGS. 10 and 11, that a reducing atmosphere yields the highest thermal conductivity H. Buhr et al., in "Phase Composition, Oxygen Content, and Thermal Conductivity of AlN($Y_2O_3$) Ceramics", *J. Am. Ceram. Soc.* 74[4], 718-723 (1991), disclose sintering cold isostatically pressed cylindrical compacts under a pressure of 0.2 MPa nitrogen. They employ heating rates of 16 to 30K per minute, sintering temperatures of 1750° to 1790° C., and sintering times of between one and three hours.

A. V. Virkar et al., in "Thermodynamic and Kinetic Effects of Oxygen Removal on the Thermal Conductivity of Aluminum Nitride", *J. Am. Ceram. Soc.* 72[11], 2031-42 (1989), fabricate polycrystaline AlN ceramics with various rare earth oxides and alkaline earth oxides. They sinter/anneal samples of the ceramics at 1850° C. for up to 1000 minutes. They obtain thermal conductivities as high as 200 W/m-K.

K. Watari et al., in "Sintering Chemical Reactions to Increase Thermal Conductivity of Aluminum Nitride", *J. Mater. Sci.* 26, 4727-32 (1991), discuss chemical reactions to increase thermal conductivity by decreasing oxygen contents during AlN sintering with an $Y_2O_3$ additive in a reducing nitrogen atmosphere with carbon. They wrap cold isostatic pressed bodies formed from admixtures of AlN powder and $Y_2O_3$ powder and sinter the wrapped bodies at temperatures of 1773, 1873, 1973, 2073 and 2173K for one hour in a 0.1 MPa nitrogen gas atmosphere. They also sinter at 2173K in the same atmosphere for two, three and five hours. They use a heating rate of 15K/minute and report thermal conductivities as high as 220 W/m-K.

T. A. Guiton et al., in "Optimization of Aluminum Nitride Thermal Conductivity Via Controlled Powder Processing", Mat. Res. Soc. Symp. Proc., Vol 271, 851-56 (1992), suggest that thermal conductivity is strongly dependent on oxygen chemistry and sintering parameters. They disclose two sets of sintering parameters, denominated as "Cycle 1" and "Cycle 2" in Table II (page 852). Cycle 2 includes a heating rate of 2.5° C./min, a sintering temperature of 1850° C., a sintering time of 3 hours, a cooling rate of 1° C./min and a cooling temperature of 1500° C.

Y. Kurokawa et al., in "Highly Thermal Conductive Aluminum Nitride Substrates", *ISHM Proceedings*, 654-61 (1987), report thermal conductivity measurements of 160 to 260 W/m-K for AlN substrates. They prepare substrates by firing an admixture of AlN powder and a $CaC_2$ powder reductant at 1900° C.

U.S. Pat. No. 4,847,221 discloses a process for preparing sintered AlN bodies as well as the resultant bodies. The process comprises firing an admixture of AlN powder and one or more rare earth compounds in an amount of 0.01 to 15 wt-% in a reducing atmosphere at a temperature of 1550° C. to 2050° C. for four hours or more. The reducing atmosphere preferably contains at least one of CO gas, $H_2$ gas, and C (gaseous or solid phase). The resultant bodies have thermal conductivities as high as 272 W/m-K.

U.S. Pat. No. 4,778,778 reports, at column 2, lines 10-26, a particular sintering cycle that is described in a copending application. The cycle provides high thermal conductivities without using very high purity aluminum nitride powder. The cycle includes: increasing the temperature of a compacted AlN body from room temperature to a sintering temperature at a rate of no more than 250° C. per hour (°C./hr); sintering the body in an inert atmosphere at a temperature of 1600° C. to 1900° C.; and cooling the sintered body at a rate of no more than 300° C./hr. The '778 patent discloses an improvement upon this cycle. The improvement includes introducing an amount of hydrogen gas along with the inert gas up to a temperature of 1200° C., after which pure inert gas is introduced. The heating rate is 10° C./hr to 200° C./hr, preferably 20° C./hr to 80° C./hr. The cooling rate is preferably between 100° C./hr and 275° C./hr. The sintering cycle used in the example is as follows: 25° C./hr to 800° C., 33° C./hr to 1000° C., 80° C./hr to 1500° C., 300° C./hr to 1800° C., soak for six hours, and cooldown at 140° C./hr.

SUMMARY OF THE INVENTION

One aspect of the present invention is a sintered polycrystalline aluminum nitride ceramic body having a thermal conductivity at room temperature (25° C.) of greater than 270 W/m-K.

A second aspect of the present invention is an improved process for preparing a sintered polycrystalline aluminum nitride body having a thermal conductivity of greater than about 200 W/m-K by heating an admixture of aluminum nitride powder and at least one powdered sintering aid in the presence of nitrogen gas to a sintering temperature, holding the admixture at that temperature for a period of time sufficient to convert the admixture to a sintered body, and thereafter cooling the body to ambient temperature, the improvement comprising a combination of heating to the sintering temperature at a rate of from greater than 0° C. per minute to about 6° C. per minute, maintaining that temperature for a period of time sufficient to convert the admixture to a sintered body having a density of greater than about 95 percent of theoretical density, and cooling the sintered body in the presence of a vacuum or an inert gas from the sintering temperature to a temperature of about 1400° C. at a rate of from greater than 0° C./minute to about 6° C./minute before cooling the sintered body further to ambient temperature (about 25° C.).

A third aspect of the present invention centers upon the sintered body resulting from the process of the second aspect.

DESCRIPTION OF PREFERRED EMBODIMENTS

AlN powder suitable for purposes of the present invention may be of commercial or technical grade. It should not contain any impurities that would have a significant adverse effect upon desired properties of a resulting sintered product. Although some level of impurities is present in commercial powders, that level should be less than that which produces the aforementioned adverse effect.

The AlN powder typically has a bound oxygen content of less than about 4 wt-%. The oxygen content is desirably less than about 3 wt-% and preferably less than about 2 wt-%.

The AlN powder also typically has a surface area, measured by conventional B.E.T. absorption methods, of from about 1.5 to about 10 square meters per gram ($m^2/g$). The powder surface area is desirably from about 2 to about 9 $m^2/g$.

AlN powder meeting these specifications are preferably prepared either by carbothermal reduction of alumina ($Al_2O_3$) or direct nitridation of aluminum metal. AlN powders may also be prepared by other processes using aluminum alkyls or aluminum halides. Preferred carbothermal AlN powders are available from The Dow Chemical Company under the trade designation XUS 35544 and XUS 35548 or Tokuyama Soda under the trade designations Grade F and Grade H. Mixtures of these and other powders may also be used.

The AlN powder may be mixed with any of the art-recognized sintering aids such as, for example, oxides or fluorides of metals selected from the group of: yttrium; rare earth metals such as lanthanum, cerium, praseodymium, neodymium, samarium, gadolinium, and dysprosium; and alkaline earth metals such as calcium, strontium and barium. A combination of sintering aids may be used in place of a single sintering aid. Yttrium compounds, particularly yttria, yield satisfactory results.

The sintering aid or combination of sintering aids is suitably admixed with AlN powder in an amount of from about 0.05 wt-% to about 10 wt-%, based upon combined weight of sintering aid and AlN powder. The amount is desirably from about 0.05 wt-% to about 3 wt-%. The sintering aid suitably has a surface area similar to that of the AlN powder.

Preparing an admixture of AlN powder and the sintering aid(s) may be carried out by conventional procedures such as attritor milling and wet and dry ball milling. Wet ball milling with an appropriate solvent and suitable milling media provides satisfactory results. Milling media, usually in the form of cylinders or balls, should have no significant adverse effect upon admixture components or upon sintered bodies prepared from the admixture. A liquid milling or mixing medium such as ethanol, heptane or another organic liquid may be used. After mixing, the organic liquid may be removed by conventional procedures to yield an admixture suitable for conversion to ceramic greenware. Oven drying and spray drying produce satisfactory results.

An organic binder may also be used during processing of the admixture into a sintered body. Suitable binders are well known in the art and typically comprise high molecular weight organic materials that are soluble in organic solvents. Illustrative binders include polyethyloxazoline, industrial waxes such as paraffin, highly viscous polyglycols, polymethylmethacrylate and polyvimyl butyral. Polyethyloxazoline is particularly suitable. The binder is suitably added to admixture components prior to milling.

Ceramic greenware may be prepared by any one of several conventional procedures such as extrusion, injection molding, die pressing, isostatic pressing, slip casting, roll compaction or forming or tape casting to produce a desired shape. Particularly satisfactory results are obtained by dry pressing a spray dried admixture or tape casting a slurry.

The ceramic greenware is desirably subjected to conditions sufficient to remove the organic binder prior to sintering. Binder removal, also known as binder burn out, typically occurs by heating the greenware to a temperature that ranges from about 50° C. to about 1000° C. to pyrolyze, or thermally decompose, the binder. The temperature varies depending upon the binder. Thermal decomposition may be carried out at or near ambient pressure or in a vacuum. It may be carried out in the presence of atmospheric air or in a nonoxidizing atmosphere. The nonoxidizing atmosphere is desirably established with an inert gas. The inert gas is suitably nitrogen, a source of nitrogen such as ammonia, or a noble gas such as argon. The inert gas is preferably nitrogen. As a general rule, binder burn out in the presence of an inert gas such as nitrogen yields a higher residual carbon level than binder burn out in the presence of atmospheric air. Binder burnout in the presence of nitrogen is preferred for purposes of the present invention.

Sintered polycrystalline aluminum nitride bodies having a thermal conductivity of greater than about 200 W/m-K are suitably prepared under nonoxidizing conditions by combining several, interrelated sintering parameters. The parameters are heating rate, sintering temperature, time at sintering temperature, cooling rate, cooling temperature, cooling environment and type and amount of sintering aid.

Sintering of the greenware occurs in the presence of gaseous nitrogen or a source of gaseous nitrogen and is followed by cooling in a nonreducing environment. The latter may be established by using either an inert gas or a vacuum. The inert gases described as suitable for binder burn out are also suitable for use in this aspect of the process. One means of establishing a nonreducing environment, at least in part, includes placing the greenware into a crucible fabricated from a non-reducing material prior to sintering and cooling. The non-reducing material is desirably selected from the group consisting of boron nitride, aluminum nitride, molybdenum metal, and tungsten metal. Boron nitride and aluminum nitride are preferred non-reducing materials for a graphite furnace. Molybdenum metal or tungsten metal are preferred non-reducing materials for a tungsten furnace.

Because the parameters of heating rate, cooling rate, sintering temperature, time at sintering temperature, cooling temperature and amount and type of sintering aid are closely interrelated, several, but not all, parameter combinations lead to thermal conductivities of 200 W/m-K or more. As an additional consideration, a given combination of parameters may produce such a thermal conductivity in one aluminum nitride powder but not in another. This disparity stems from variations in powder properties, particularly impurity levels, and in methods of synthesizing powders as in carbothermal synthesis versus direct nitridation. As a further consideration, differences in binder burn out atmosphere lead to modifications of desirable parameter combinations.

Using a single AlN powder as an example, various parameter combinations for nitrogen binder burn out (BBO) and air BBO that produce a thermal conductivity of 200 W/m-K or more using 3 wt-% $Y_2O_3$ as a sintering aid are shown in Table I. The AlN powder is commercially available from The Dow Chemical Company under the trade designation XUS 35548 and has the following specification: an oxygen content of $0.8 \pm 0.2$ wt-%; a carbon content $\leq 0.08$ wt-%; a silicon content $\leq 100$ parts per million (ppm); a calcium content $\leq 200$ ppm; an iron content $\leq 35$ ppm; and a surface area of $2.8 \pm 0.2$ m$^2$/g.

Parameter combinations for nitrogen BBO that produce a thermal conductivity of 270 W/m-K or more using the same AlN powder and either 2 wt-% or 3 wt-% $Y_2O_3$ as a sintering aid are shown in Table II. The amount of $Y_2O_3$ varies in direct proportion to the AlN powder's oxygen content. In other words, with an oxygen content at or near 0.6 wt-%, 2 wt-% $Y_2O_3$ suffices whereas an oxygen content at or near 1.0 wt-% requires as much as 3 wt-% $Y_2O_3$. The actual level of sintering aid is tied, at least in part to residual carbon levels, and may be readily determined without undue experimentation.

TABLE I

| Condition | BBO Atmosphere | Sinter Temp (°C.) | Sinter Time (min.) | Heat Rate (°C./min) | Cool Rate (°C./min) |
|---|---|---|---|---|---|
| 1 | $N_2$ | 1817 | 165 | $\leq 1.2$ | $\leq 5.4$ |
| 2 | $N_2$ | 1817 | 165 | $\leq 0.6$ | $\leq 5.4$ |
| 3 | $N_2$ | 1817 | 165 | $\leq 5.4$ | 0.1 |
| 4 | $N_2$ | 1817 | 165 | $\leq 5.4$ | $\leq 1.1$ |
| 5 | $N_2$ | 1817 | $\leq 278$ | $\leq 5.4$ | 0.1 |
| 6 | $N_2$ | 1862 | 165 | $\leq 5.4$ | $\leq 5.5$ |
| 7 | $N_2$ | 1908 | 238 | $\leq 2.3$ | $\leq 5.5$ |
| 8 | $N_2$ | 1908 | 238 | $\leq 1.6$ | $\leq 5.5$ |
| 9 | $N_2$ | 1908 | $\geq 133$ | 1.6 | $\leq 5.5$ |
| 10 | $N_2$ | 1908 | 165 | $\leq 5.4$ | $\leq 0.5$ |
| 11 | $N_2$ | 1908 | 165 | 3 | $\leq 1.1$ |
| 12 | $N_2$ | 1908 | 165 | 0.6 | $\leq 5.5$ |
| 13 | Air | 1862 | 165 | $\leq 1.3$ | 0.1 |
| 14 | Air | 1862 | 165 | $\leq 0.8$ | $\leq 0.5$ |
| 15 | Air | 1862 | 165 | $\leq 0.6$ | $\leq 0.5$ |

TABLE II

| Condition | Sinter Temp (°C.) | Sinter Time (min.) | Heat Rate (°C./min) | Cool Rate (°C./min) | Cooling Temp (°C.) |
|---|---|---|---|---|---|
| 1 | 1850–1875 | 80–180 | 0.6 | 0.1 | $\leq 1650$ |
| 2 | 1850–1875 | 80–180 | 0.6 | $\leq 0.2$ | $\leq 1275$ |
| 3 | 1850–1875 | 80–180 | 0.8 | 0.1 | $\leq 1275$ |
| 4 | 1850–1875 | 80–180 | $\leq 1.4$ | 0.1 | 1160 |
| 5 | 1850–1875 | 80–180 | $\leq 1.7$ | 0.1 | 1160 |
| 6 | 1850–1875 | 80–180 | 0.6 | $\leq 0.6$ | 1160 |
| 7 | 1850–1875 | 80–180 | 0.6 | $\leq 0.4$ | 1160 |
| 8 | 1850–1875 | 80–180 | $\leq 1$ | 0.4 | 1160 |
| 9 | 1863 | 165 | $\leq 3$ | 0.1 | $\leq 1400$ |

The combinations shown in Tables I and II are particularly suitable when the powder is XUS 35548 (The Dow Chemical Company). Some modification of the combinations may be needed depending upon factors such as oxygen content of the AlN powder, residual carbon content of the AlN greenware and amount and type of sintering aid present in the greenware. If, for example, the powder has an oxygen content at or near the upper limit of the specification and the amount of $Y_2O_3$ is 3 wt-% in Table I or 2 wt-% in Table II, modification may be necessary only for condition 9 of Table II. As another example, modification of conditions 1, 7, 9, 11 and 14 of Table I may also be necessary when such a powder is used in combination with a lesser amount, such as 2 wt-%, of $Y_2O_3$. The modification, particularly with respect to Table I, may be as simple as lowering the upper limit of the cooling rate by less than 1° C./min. If the same powder has an oxygen content at or near the lower limit of the specification, the lesser amount of $Y_2O_3$ may be used with little or no modification of the combinations shown in Tables I and II. Further modifications may be made without undue experimentation.

The combinations shown in Tables I and II generally suffice to yield a sintered body having a density of greater than about 95 percent of theoretical density. The density is desirably $\geq 97.5\%$, preferably $\geq 99\%$ and more preferably $\geq 99.5\%$ of theoretical density.

Sintered AlN bodies prepared under nonreducing conditions in accordance with the process of the present invention have a thermal conductivity in excess of about 200 W/m-K. The thermal conductivity is desirably greater than about 240 W/m-K, preferably greater than about 270 W/m-K. The thermal conductivity is also desirably about 319 W/m-K or less. A thermal conductivity of about 285 W/m-K or less is readily attainable.

Sintered AlN bodies prepared as described herein also display color/translucency combinations that range from light cream and translucent to dark gray or even black and opaque. Surface appearance, also known as mottling (marked with spots or blotches of different color or shades of color as if stained), also varies from a high degree of mottling to an absence of visually detectable mottling. Skilled artisans can attain a desired combination of color, degree of mottling and thermal conductivity without undue experimentation.

The following example is solely for purposes of illustration and is not to be construed, by implication or otherwise, as limiting the scope of the present invention. All parts and percentages are by weight and all temperatures are in degrees Centigrade (°C.) unless otherwise specified.

EXAMPLE

Ceramic greenware is prepared from admixtures of 2000 g quantities of various AlN powders, either 2 or 3% (41 g or 62 g) $Y_2O_3$ (Molycorp, 99.99% purity) and 6.7% (134.2 g) of a binder composition. The binder composition is a 33/67 weight ratio blend of polyethyloxazoline and polyethylene glycol 3350 (The Dow Chemical Company). The binder is dissolved in 3000 g of ethanol after which the AlN and $Y_2O_3$ powders are added. The admixtures are ball milled for five hours. The solvent is removed by spray drying.

TABLE III

| Powder ID | O (wt %) | C (wt %) | Si (ppm) | Ca (ppm) | Fe (ppm) | S.A. (m²/g) |
|---|---|---|---|---|---|---|
| A | 0.63 | 0.03 | 77 | 158 | 17 | 2.75 |
| B | 1.04 | 0.05 | 74 | 107 | 17 | 2.86 |
| C | 1.19 | 0.05 | 94 | 189 | 28 | 3.33 |
| D | 1.25 | 0.04 | <20 | 84 | <10 | 3.67 |
| E | 0.91 | 0.03 | 36 | 220 | <10 | 2.72 |

Powder Data column headings above; S.A. = surface area ($m^2/g$).

The dried powders are dry pressed into greenware using a 7/8 inch (2.2 cm) round die under uniaxial pressure at 6.9 megapascals (MPa). The binder composition is removed from the greenware in the presence of either air (air BBO) or nitrogen ($N_2$ BBO). Binder removal employs a heating rate of 2° C./min up to 550° C., a one hour hold at that temperature and a cooling rate of 2° C./min down to room temperature (25° C.).

The AlN powders and their chemical composition are shown in Table III. AlN powders A and B are different lots of powder commercially available from The Dow Chemical Company under the trade designation XUS 35548. AlN powder C is a powder commercially available from The Dow Chemical Company under the trade designation XUS 35544. AlN powders D and E are commercially available from Tokuyama Soda Co., Ltd. as, respectively, grades F and H.

A boron nitride (BN) box measuring 7.5 inch by 4.5 inch by 3.5 inch (19.0 cm by 11.4 cm by 8.9 cm) is used as a container to establish a non-reducing environment. The greenware resulting from binder removal is placed in boron nitride setters, one for air BBO and one for $N_2$ BBO. A one cubic foot (0.028 cubic meter) graphite furnace (Thermal Technology Model 121212G) is used for sintering.

The conditions used for sintering are shown in Table IV. Table V shows the results of sintering $N_2$ BBO greenware. Table VI shows the results of sintering air BBO greenware. Column headings in Tables V and VI, such as A-3 or B-2 refer to the AlN powder type (Table III) before the hyphen and the amount of sintering aid, in weight percent, after the hyphen. Two thermal conductivity values are shown for most sintering runs in Tables V and VI. This reflects measurements made on two different pieces of greenware made from a single admixture and sintered at the same time.

TABLE IV

Sintering Package Design

| Sintering Run | Heating Rate (°C./min) | Soak Temperature (°C.) | Soak Time (minutes) | Cooling Rate (°C./min) | Cooling Temperature (°C.) | Total Time (hours) |
|---|---|---|---|---|---|---|
| 1 | 1 | 1825 | 300 | 0.5 | 1600 | 26 |
| 2 | 3 | 1862.5 | 165 | 2.8 | 1400 | 12.8 |
| 3 | 5 | 1825 | 30 | 5 | 1200 | 8.3 |
| 4 | 5 | 1900 | 30 | 5 | 1600 | 8.6 |
| 5 | 3 | 1862.5 | 165 | 2.8 | 1400 | 12.8 |
| 6 | 1 | 1900 | 300 | 5 | 1600 | 20.9 |
| 7 | 3 | 1862.5 | 329 | 2.8 | 1400 | 16.7 |
| 8 | 5 | 1900 | 30 | 0.5 | 1200 | 30.9 |
| 9 | 5 | 1825 | 30 | 0.5 | 1600 | 13.7 |
| 10 | 1 | 1900 | 30 | 5 | 1200 | 17.8 |
| 11 | 3 | 1862.5 | 1 | 2.8 | 1400 | 11.3 |
| 12 | 3 | 1862.5 | 165 | 2.8 | 1157 | 14.2 |
| 13 | 3 | 1862.5 | 165 | 0.1 | 1400 | 88 |
| 14 | 5 | 1825 | 300 | 5 | 1600 | 11.4 |
| 15 | 5 | 1825 | 300 | 0.5 | 1200 | 31.6 |
| 16 | 5 | 1900 | 300 | 0.5 | 1600 | 21.2 |
| 17 | 3 | 1862.5 | 165 | 2.8 | 1643 | 11.3 |
| 18 | 3 | 1862.5 | 165 | 2.8 | 1400 | 12.8 |
| 19 | 5 | 1900 | 300 | 5 | 1200 | 13.3 |
| 20 | 1 | 1825 | 30 | 0.5 | 1200 | 35 |
| 21 | 3 | 1817 | 165 | 2.8 | 1400 | 13.4 |
| 22 | 0.6 | 1862.5 | 165 | 2.8 | 1400 | 26.8 |
| 23 | 1 | 1825 | 300 | 5 | 1200 | 20.7 |
| 24 | 1 | 1900 | 30 | 0.5 | 1600 | 25.6 |
| 25 | 3 | 1908 | 165 | 2.8 | 1400 | 14.5 |
| 26 | 1 | 1825 | 30 | 5 | 1600 | 14.8 |
| 27 | 3 | 1862.5 | 165 | 5.5 | 1400 | 11.4 |
| 28 | 3 | 1862.5 | 165 | 2.8 | 1400 | 12.8 |
| 29 | 5.4 | 1862.5 | 165 | 2.8 | 1400 | 11.2 |
| 30 | 1 | 1900 | 300 | 0.5 | 1200 | 43.1 |

TABLE V

Measured Thermal Conductivities (W/m-K) for Sintered Parts Prepared From Nitrogen Debindered Greenware

| Sintering Run | A-2 | B-2 | B-3 | C-3 | D-3 | E-3 |
|---|---|---|---|---|---|---|
| 1 | 223–231 | 211–225 | 200–208 | 206–220 | 206 | 200–205 |
| 2 | 217–218 | 208–213 | 208–212 | 206–211 | 206 | 197–198 |
| 3 | 189–193 | 189–195 | 192–196 | 183–184 | 189 | 180–182 |
| 4 | 181–181 | 160–164 | 180–181 | 173–174 | 180 | 188–189 |
| 5 | 218–223 | 215–219 | 213–217 | 217–218 | 224 | 207–214 |
| 6 | 228–238 | 224–233 | 221–228 | 226–231 | 219 | 207–214 |
| 7 | 202–208 | 182–189 | 203–205 | 189–194 | 200 | 208–208 |
| 8 | 201–202 | 184–185 | 204–209 | 204–207 | 199 | 205–208 |
| 9 | 208–210 | 214–215 | 208–210 | 210–213 | 214 | 204–206 |
| 10 | 213–225 | 209–213 | 205–206 | 209–212 | 214 | 198–198 |
| 11 | 182–186 | 165–167 | 181–181 | 177–181 | 182 | 192–195 |
| 12 | 233–233 | 216–223 | 218–219 | 214–222 | 230 | 216–219 |
| 13 | 269–274 | 258–267 | 274–277 | 260–270 | 285 | 256–263 |
| 14 | 214–221 | 206–206 | 208–213 | 205–205 | 210 | 202–199 |
| 15 | 181–200 | 187–206 | 212–212 | 186–194 | 207 | 208–208 |
| 16 | 204–208 | 206–207 | 201–204 | 197–200 | 211 | 198–199 |
| 17 | 213–217 | 215–215 | 209–213 | 206–209 | 216 | 202–204 |
| 18 | 217–220 | 221–223 | 212–214 | 207–209 | 226 | 205–205 |
| 19 | 228–231 | 232–236 | 221–228 | 216–220 | 253 | 216–217 |
| 20 | 242–245 | 244–244 | 245–247 | 236–236 | 240 | 229–229 |
| 21 | 189–195 | 177–178 | 187–193 | 177–182 | 189 | 193–198 |
| 22 | 222–231 | 225–230 | 222–224 | 220–222 | 217 | 214–215 |
| 23 | 223–223 | 217–227 | 216–219 | 213–217 | 223 | 208–208 |
| 24 | 237–238 | 225–228 | 221–225 | 223–224 | 225 | 214–222 |
| 25 | 193–196 | 180–186 | 199–203 | 192–193 | 196 | 196–202 |
| 26 | 197–203 | 197–199 | 198–200 | 191–193 | 190 | 184–185 |
| 27 | 208–210 | 202–203 | 208–215 | 205–206 | 205 | 198–199 |
| 28 | 217–220 | 202–203 | 205–207 | 206–207 | 203 | 202–203 |
| 29 | 218–220 | 200–204 | 211–217 | 205–210 | 203 | 202–205 |
| 30 | 235–235 | 225–233 | 227–228 | 229–235 | 235 | 218–221 |

TABLE VI

Measured Thermal conductivities (W/m-K) For Sintered Parts Prepared From Air Debindered Greenware

| Sintering Run | A-2 | B-2 | B-3 | C-3 | D-3 | E-3 |
|---|---|---|---|---|---|---|
| 1 | 178–179 | 158–166 | 180–185 | 179–187 | 182 | 182–183 |
| 2 | 160–163 | 153–155 | 171–172 | 167–175 | 164 | 169–170 |
| 3 | 153–153 | 134–135 | 161–164 | 162–164 | 161 | 158–162 |
| 4 | 138–141 | 125–125 | 161–161 | 147–148 | 148 | 160–161 |
| 5 | 163–166 | 154–155 | 179–181 | 169–170 | 175 | 173–177 |
| 6 | 182–187 | 169–177 | 186–189 | 188–189 | 183 | 182–185 |
| 7 | 157–160 | 144–145 | 175–179 | 160–163 | 167 | 173–173 |
| 8 | 162–164 | 152–155 | 179–182 | 167–170 | 168 | 181–185 |
| 9 | 182–183 | 159–166 | 185–194 | 184–189 | 182 | 178–179 |
| 10 | 165–166 | 153–153 | 180–183 | 168–169 | 171 | 175–177 |
| 11 | 146–147 | 120–123 | 162–163 | 154–159 | 159 | 164–166 |
| 12 | 167–167 | 156–160 | 186–188 | 181–182 | 185 | 180–184 |
| 13 | 207–211 | 198–200 | 217–217 | 214–214 | 218 | 206–207 |
| 14 | 177–182 | 162–165 | 179–182 | 181–184 | 183 | 178–186 |
| 15 | 179–185 | 169–170 | 185–189 | 172–177 | 175 | 188–194 |
| 16 | 138–141 | 125–134 | 149–152 | 133–140 | 131 | 135–147 |
| 17 | 159–161 | 148–151 | 172–177 | 163–164 | 162 | 162–173 |
| 18 | 161–164 | 154–156 | 175–176 | 164–168 | 164 | 171–176 |
| 19 | 171–180 | 165–170 | 179–181 | 171–179 | 193 | 180–184 |
| 20 | 177–189 | 178–184 | 192–193 | 186–192 | 180 | 192–199 |
| 21 | 165–168 | 140–139 | 171–174 | 170–178 | 177 | 172–175 |
| 22 | 172–173 | 160–162 | 186–187 | 175–178 | 175 | 179–183 |
| 23 | 176–176 | 166–172 | 185–190 | 175–177 | 189 | 182–190 |
| 24 | 177–179 | 175–182 | 190–191 | 178–186 | 176 | 185–186 |
| 25 | 156–157 | 145–148 | 175–179 | 159–161 | 163 | 172–175 |
| 26 | 167–167 | 149–150 | 169–175 | 174–176 | 177 | 170–171 |
| 27 | 161–162 | 153–154 | 174–182 | 165–196 | 173 | 174–175 |
| 28 | 164–167 | 156–159 | 181–181 | 174–175 | 177 | 178–181 |
| 29 | 165–165 | 153–158 | 175–181 | 170–170 | 170 | 177–180 |
| 30 | 188–196 | 181–185 | 200–200 | 187–194 | 195 | 192–192 |

The data in Table V show that a thermal conductivity of 200 W/m-K or more is readily attainable under most of the sintering conditions of Table IV. In fact, sintering run 13 provides thermal conductivities of 270–285 W/m-K for several powders. Sintering runs 3, 4, 11 and 21 are notable exceptions in that the sintering conditions fail to yield any sintered materials with a thermal conductivity of 200 W/m-K or more. Sintering runs 14, 25 and 26, for example, show that some variability in thermal conductivity is present even when two pieces of substantially identical greenware are subjected to the same sintering conditions. Sintering runs 2, 7, 8, 10, 15, 16 and 27 show that variations in powder properties lead to differing results under identical sintering conditions. Based upon the number of sintering run/powder combinations that do provide a thermal conductivity of at least 200 W/m-K, combinations that do not are readily modified to at least that level by skilled artisans without undue experimentation.

The data in Table VI show that a thermal conductivity of 200 W/m-K or more is rarely attainable under the conditions shown in Table IV. The success of sintering run 13 suggests that a skilled artisan might make modifications such as an increase in amount of sintering aid or a decrease in cooling rate, heating rate or both to achieve a thermal conductivity of at least 200 W/m-K. A comparison of run 13 from Table V with run 13 from Table VI suggests that a thermal conductivity in excess of about 270 W/m-K may not be attainable when an air BBO procedure is used with those combinations. However, with elevated levels of $Y_2O_3$ or some other appropriate sintering additive, such thermal conductivities may be possible.

Analysis of all of the sintered bodies, including those having a thermal conductivity greater than about 270 W/m-K, by powder X-ray diffraction and electron microscopy reveals the presence of crystalline AlN and secondary boundary phases. The boundary phases contain $Y_4Al_2O_9$, $YAlO_3$ or both. The boundary phase may be along grain boundaries, at triple points or both. The analysis does not reveal the presence of yttrium nitride.

Similar results are expected with these powders and the sintering conditions of Tables I and II. Although some changes in sintering conditions may be required, similar results are also expected with other AlN powders.

What is claimed is:

1. An improved process for preparing a sintered polycrystalline aluminum nitride body having a thermal conductivity of greater than about 200 watts/meter·° K by heating an admixture of aluminum nitride powder and at least one powdered sintering aid in the presence of nitrogen gas to a sintering temperature, holding the admixture at that temperature for a period of time sufficient to convert the admixture to a sintered body, and thereafter cooling the body to ambient temperature, the improvement comprising a combination of heating to the sintering temperature at a rate of from greater than 0° C. per minute to about 6° C. per minute, maintaining that temperature for a period of time sufficient to convert the admixture to a sintered body having a density of greater than about 95 percent of theoretical density, and cooling the sintered body in the presence of a vacuum or an inert gas from the sintering temperature to a temperature of about 1400° C. at a rate of from greater than 0° C./minute to about 6° C./minute before cooling the sintered body further to ambient temperature.

2. The process of claim 1 wherein the admixture is converted to ceramic greenware prior to sintering.

3. The process of claim 1 wherein cooling is accomplished in the presence of an inert gas.

4. The process of claim 3 wherein the inert gas is selected from the group consisting of nitrogen, argon, and helium.

5. The process of claim 1 wherein the rate of cooling is from about 0.1° C./minute to about 5.5° C./minute.

6. The process of claim 1 wherein the sintered body is further present in a non-reducing environment during cooling in the presence of a vacuum or an inert gas.

7. The process of claim 6 wherein the non-reducing environment is established by placing the admixture into a crucible fabricated from a non-reducing material prior to sintering and cooling.

8. The process of claim 7 wherein the non-reducing material is selected from the group consisting of boron nitride, aluminum nitride, molybdenum metal and tungsten metal.

9. The process of claim 1 wherein the sintering temperature is within a range of from about 1817° to about 1908° C.

10. A sintered polycrystalline aluminum nitride body having a microstructure characterized by a crystalline aluminum nitride phase and secondary grain boundary phases and a thermal conductivity of greater than about 270 watts/meter·°K.

11. The body of claim 10 wherein the thermal conductivity is less than about 319 watts/meter·°K.

12. The sintered body of claim 10 wherein the grain boundary phases comprise at least one yttrium-aluminate selected from $Y_4Al_2O_9$ and $YAlO_3$.

13. The sintered body of claim 10 wherein the grain boundary phases are located along grain boundaries, at triple points or both.

* * * * *